United States Patent [19]

Lynn et al.

[11] 4,299,801

[45] Nov. 10, 1981

[54] REGENERATING ALKANOLAMINE DESULFURIZER SOLUTIONS

[75] Inventors: James B. Lynn; Joseph A. Laslo, both of Bethlehem; Otto A. Homberg, Easton, all of Pa.

[73] Assignee: Bethlehem Steel Corporation, Bethlehem, Pa.

[21] Appl. No.: 207,834

[22] Filed: Nov. 18, 1980

[51] Int. Cl.³ ............................................. B01D 53/34
[52] U.S. Cl. .................................... 423/228; 423/220; 423/229
[58] Field of Search ................ 423/220, 226, 228, 229

[56] References Cited

U.S. PATENT DOCUMENTS

| | | | |
|---|---|---|---|
| 2,600,328 | 6/1952 | Riesenfeld et al. | 423/228 |
| 2,613,132 | 10/1952 | Hutchinson | 423/228 |
| 3,958,943 | 5/1976 | Carmassi et al. | 23/255 R |
| 4,073,863 | 2/1978 | Giammarco et al. | 423/222 |
| 4,138,230 | 2/1979 | Thompson | 55/48 |

*Primary Examiner*—Earl C. Thomas
*Attorney, Agent, or Firm*—Joseph J. O'Keefe; Charles A. Wilkinson; Michael Leach

[57] ABSTRACT

A method for regenerating a spent alkanolamine absorbing solution containing absorbed $H_2S$ and $CO_2$ in two desorption stages to produce two separate acid gas streams. The first acid gas stream that contains substantially all of the $H_2S$ is sent to a sulfur recovery system and the second acid gas stream that is primarily $CO_2$ is vented to the atmosphere. The desorption stages are connected in series and both are operated at substantially the same above-atmospheric pressure within the range of 8–12 psig (1.54–1.82 atm abs).

8 Claims, 2 Drawing Figures

REGENERATING ALKANOLAMINE DESULFURIZER SOLUTIONS

FIELD OF THE INVENTION

The method of this invention relates to the absorption of $H_2S$ and $CO_2$ from gas streams using alkanolamine absorbing solutions. More particularly, this invention relates to the regeneration of spent alkanolamine absorbing solutions containing $H_2S$ and $CO_2$.

BACKGROUND OF THE INVENTION

Selectively removing $H_2S$ from a gas stream containing $H_2S$ and $CO_2$ is a process common to many industries such as the coke-making, the petroleum and the natural gas industries. Of the several techniques for such removal that are commonly employed, one utilizes the selective removal of $H_2S$ into aqueous alkanolamine absorbing solutions which can then be regenerated to afford a concentrated $H_2S$ gas stream for further processing in a sulfur recovery system. The $H_2S$ and $CO_2$ containing gas stream, such as a coke oven gas stream, is usually treated with the alkanolamine absorbing solution in any suitable absorption apparatus such as a packed bed absorber, a spray contact apparatus, a bubble-cap tray absorber or the like.

The $H_2S$ will react almost instantaneously with the aqueous alkanolamine solution to form alkanolammonium sulfide or hydrosulfide. Carbon dioxide, on the other hand, takes a significantly finite time to react with the water in the alkanolamine solution to form carbonic acid according to the well-known equilibrium reaction prior to reacting with the alkanolamine to form alkanolammonium carbonate or bicarbonate. Thus the $CO_2$ does not tend to be taken up by the alkanolamine solution as readily and is consequently not removed from the gas stream as quickly as the $H_2S$. Accordingly, by controlling the time that the gas is in contact with the absorbing solution, $H_2S$ can be selectively removed.

Subsequent to the absorber is the desorption stage in which the absorbed gases are driven out of the spent absorbing solution by the application of heat, such as stripping steam, to decompose the alkanolammonium sulfides and carbonates. It takes a longer time to decompose the alkanolammonium carbonates and strip the $CO_2$ from the alkanolamine solution than to strip the $H_2S$ because of the necessity of proceeding through the carbonic acid equilibrium reaction to yield water and the $CO_2$ which is finally expelled. The alkanolammonium sulfides, on the other hand, simply break down directly to yield $H_2S$ which is quickly expelled from the solution. Liberating the $H_2S$ and $CO_2$ affords a regenerated absorbing solution from which substantially all the $H_2S$ has been driven off, but which still contains a significant amount of absorbed $CO_2$, for recycling to the absorber. The liberated $H_2S$ and $CO_2$ form an acid gas stream which is directed to a sulfur recovery plant, such as a Claus plant or sulfuric acid plant. Since $H_2S$ and $CO_2$ are desorbed at different rates, the ratio of $H_2S$ to $CO_2$ in the acid gas stream will be higher than that in either the spent or the regenerated absorbing solutions under steady state operating conditions. Of particular importance, the $H_2S$ content of the acid gas stream must be a minimum percentage in order to maintain the operation of the Claus plant burner. If the content of the $H_2S$ relative to $CO_2$ falls too low, the Claus burner will be extinguished.

Mandated changes in coking practices owing to governmental regulations resulted in increased levels of $CO_2$ being generated during the coking process. Consequently, the spent alkanolamine absorbing solution from the absorption stage contained relatively more $CO_2$. This caused the $H_2S$ and $CO_2$ acid gas stream emanating from the desorption stage to have its $CO_2$ content increased to such an extent that the percentage of $H_2S$ dropped to near or below that amount necessary to maintain the Claus sulfur recovery plant operative. Furthermore, the regenerated alkanolamine solution also contained more $CO_2$ which caused corrosion problems in the reboiler steam tube bundle of the desorption stage because of the formation of extremely corrosive carbamates. This corrosion problem has necessitated interruption of the operation and replacement of the reboiler tube bundle. Diligent use of corrosion inhibitors may extend somewhat the life of the reboiler tube bundles.

U.S. Pat. No. 4,073,863 discloses a method for regenerating absorbing solution used for removing acid gases from gaseous mixtures. Regeneration is effected by steam stripping in a desorption stage comprising a main column operating at a high pressure and by means of a supply of outside heat and a secondary column operating at a lower pressure and substantially by means of the steam obtained by the expansion of the solution which had been regenerated in the main column. The exhausted absorbing solution is incompletely regenerated in one of the two columns and then completely regenerated in the other column. In one of the disclosed embodiments the spent absorbing solution is conveyed to a secondary regeneration column at a lower pressure and then conveyed to the main regeneration column at a higher pressure. In the secondary column the spent solution is heated and pre-regenerated by the steam produced by the expansion of the regenerated solution extracted from the main column. The regeneration of the solution is completed in the main column through supply of heat from the outside. The patent states that this embodiment has the advantage of desorbing $H_2S$ substantially in the secondary column.

The shortcoming of the above referred-to embodiment of U.S. Pat. No. 4,073,863 is that it would not be applicable to the regeneration of an alkanolamine absorbing solution although it is applicable to carbonate absorbing solutions. The secondary, low pressure regeneration column would not provide the temperatures which are necessary to strip even a significant amount of $H_2S$ and $CO_2$ from an alkanolamine absorbing solution. Consequently, essentially all the stripping of the $H_2S$ and $CO_2$ would be effected in the main, high pressure regeneration column. This means that the solution from the main, high pressure column fed to the reboiler would be extremely corrosive resulting in the same problem encountered in the conventional system. On the other hand, if the secondary, low pressure column were indeed operated at a temperature and pressure sufficient to drive the $H_2S$ from the alkanolamine solution, operating the main regeneration column at a still higher pressure would be very wasteful in terms of compression costs and heat economy.

Consequently there is a need for an alkanolamine regeneration process which reduces the $CO_2$ level in the acid gas stream to a sulfur recovery plant, such as a Claus plant or sulfuric acid plant, to improve its efficiency and also reduces the $CO_2$ level in the regenerated solution to increase the capacity of the desulfurizing absorption stage.

There is also a need for an alkanolamine regeneration process that reduces the corrosion problems which necessitate the frequent replacement of the reboiler steam tube bundle.

There is additionally a need for an alkanolamine regeneration process which produces an acid gas stream that has an increased $H_2S$ content and maintains the Claus sulfur recovery plant operative.

There is in addition a need for a regeneration process that does not require the operation of a plurality of desorption stages each at different pressures.

SUMMARY OF THE INVENTION

The aforementioned difficulties and needs relating to the regeneration of alkanolamine absorbing solutions used in desulfurizing an $H_2S$ and $CO_2$ containing gas stream can be solved in accordance with the present invention. We have discovered a method for regenerating a spent alkanolamine absorbing solution which is applicable to a process for treating an $H_2S$ and $CO_2$ containing gas stream with an alkanolamine absorbing solution in an absorption stage. The gas treating processes to which this invention is applicable generally further comprise removing from the absorption stage a spent alkanolamine absorbing solution containing absorbed $H_2S$ and $CO_2$, conveying the spent absorbing solution to a desorption stage, steam stripping the absorbed $H_2S$ and $CO_2$ from the spent absorbing solution to yield an $H_2S$ and $CO_2$ acid gas stream for routing to a sulfur recovery plant and a regenerated alkanolamine absorbing solution for recycling to the absorption stage. The improved method for regenerating the spent absorbing solution comprises (a) passing the spent alkanolamine absorbing solution to a first desorption stage, (b) stripping the spent alkanolamine absorbing solution with steam to liberate substantially all the absorbed $H_2S$ yielding an acid gas stream for the sulfur recovery plant and a partially regenerated alkanolamine absorbing solution, (c) passing the partially regenerated alkanolamine absorbing solution to a second desorption stage, (d) stripping the partially regenerated alkanolamine absorbing solution with steam under substantially the same pressure existing during step (b) to liberate primarily $CO_2$ and to afford a regenerated alkanolamine absorbing solution for recycling to the absorption stage, and (e) heating the regenerated alkanolamine absorbing solution to generate stripping steam which is proportioned between the first and the second desorption stages to effect the stripping of $H_2S$ and $CO_2$ in steps (b) and (d), respectively.

The invention utilizes two desorption stages to produce two separate acid gas streams. The first acid gas stream that contains substantially all the $H_2S$ with some $CO_2$ is sent to a sulfur recovery system and the second acid gas stream that contains primarily $CO_2$ with very little $H_2S$ may be vented to the atmosphere. The high $H_2S$ content in the first acid gas stream will easily maintain a Claus plant operative. The desorption stages are connected in series and are operated at substantially the same above atmospheric pressure within the range of 8–12 psig. Moreover, by using a single reboiler to heat the fully regenerated absorbing solution to supply stripping steam to both desorption stages, the concentration of $CO_2$ in the alkanolamine absorbing solution in the reboiler is kept sufficiently low to avoid significant corrosion problems which would exist in the reboiler associated with the first desorption stage if each desorption stage was supplied with steam from its own associated reboiler. The alkanolamine composing the absorbing solution may be, for example, monoethanolamine, diethanolamine, di-isopropanolamine or any other alkanolamine known in the art for removing $H_2S$ and $CO_2$ from gas streams.

DETAILED DESCRIPTION OF THE INVENTION

Figure 1:
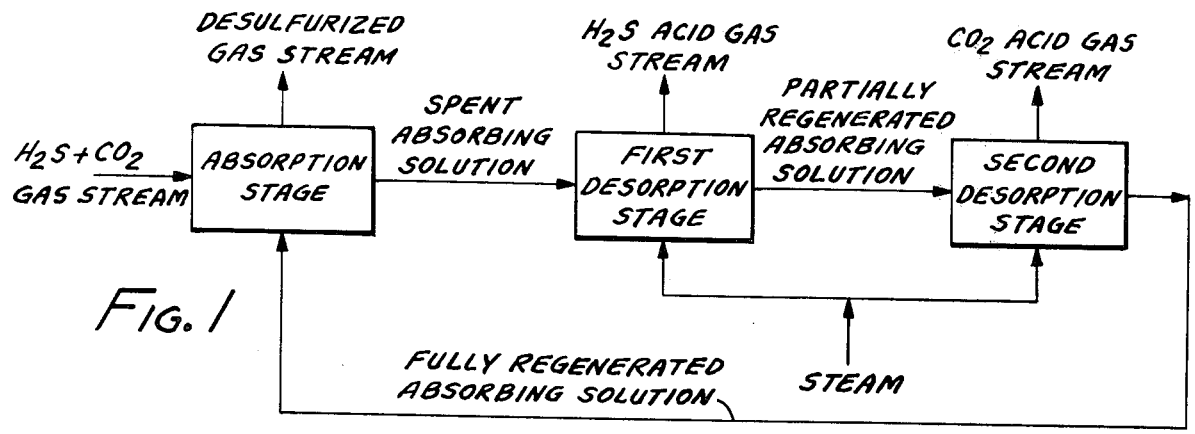
FIG. 1 is a flow diagram of the basic method of this invention.

Referring to the block diagram in FIG. 1, and $H_2S$ and $CO_2$ containing gas stream enters an absorption stage where acid gas contaminants are absorbed into an aqueous alkanolamine absorbing solution in a manner described, for example, in *The Gas Conditioning Fact Book*, Chapter 3, Dow Chemical Co., 1962 and other references well known in the art. The gas stream with the $H_2S$ and much of the $CO_2$ removed leaves the absorber as a desulfurized gas stream. The spent alkanolamine absorbing solution is sent to a first desorption stage in which the spent solution is partially regenerated with sufficient steam to desorb substantially all the $H_2S$ and a portion of the $CO_2$ which leaves as an acid gas stream. The partially regenerated solution is next conveyed to a second desorption stage supplied with sufficient steam to desorb a major portion of the absorbed $CO_2$ to afford a fully regenerated alkanolamine absorbing solution for recycling to the absorption stage.

Figure 2:
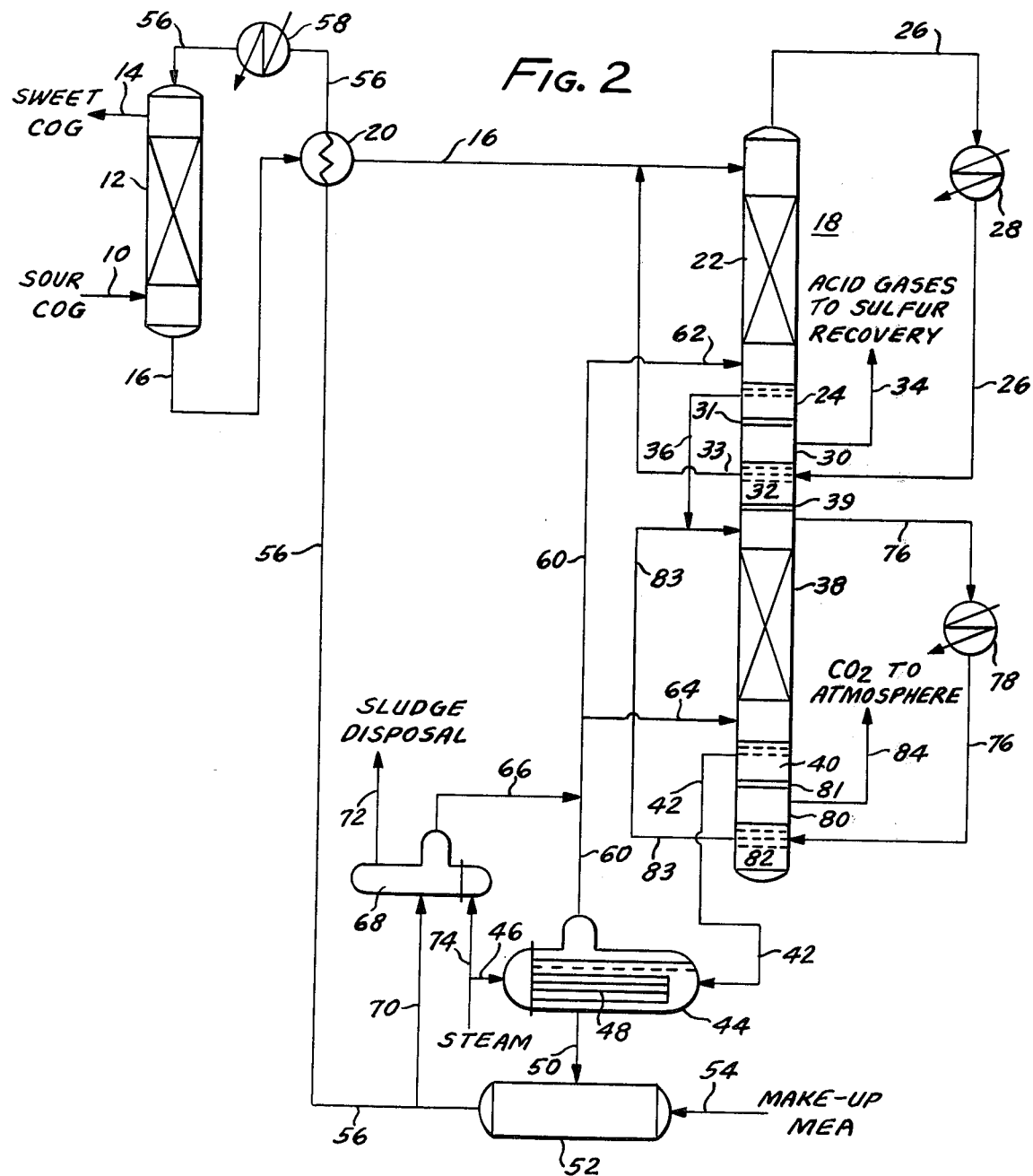
FIG. 2 is a schematic representation of the steps of a preferred embodiment of the process of this invention.

Referring now to FIG. 2, the preferred embodiment of the invention will be described as a process for desulfurizing coke oven gas with an aqueous monoethanolamine (MEA) absorbing solution. Sour coke oven gas (COG) in stream 10, containing about 350 grains $H_2S$ and about 28 grains of HCN per 100 ft$^3$ of gas (8.0 g/m$^3$ $H_2S$ and 0.64 g/m$^3$ HCN) and about 2.5% by volume $CO_2$, enters an absorber 12 operating at a pressure of about 1 psig (1.07 atm abs) and a temperature from 80°–115° F. (27°–46° C.) in which the downward flow of a 15% aqueous MEA solution scrubs out the acid gases in a process known in the art as "sweetening" the gas stream. The sweetened coke oven gas exits as desulfurized gas stream 14 which contains roughly 20 to 25 grains $H_2S$ per 100 ft$^3$ (0.45 to 0.57 g/m$^3$), a negligible amount of HCN and about 1.1% by volume $CO_2$. For a daily coke oven gas flow rate of about 100 million ft$^3$ (2.83×10$^6$ m$^3$), the circulation rate of the MEA solution would be about 700 gpm (2650 l/min).

After sweetening the coke oven gas, the spent MEA solution in stream 16, containing about 500 ppm HCN, 6000 ppm $H_2S$ and 25,000 ppm $CO_2$, leaves the absorber 12 and is pumped to the two stage desorber 18, after having passed through a heat exchanger 20 to extract heat from the hot regenerated MEA solution returning as stream 56 to the absorber 12. The heated, spent MEA solution enters the top of the first desorption stage 22 comprising a distillation column of appropriate design operating at 240°–250° F. (115°–121° C.) under a pressure of 8 to 12 psig (1.54 to 1.82 atm abs), where it is countercurrently contacted with steam from line 62 flowing at a rate of about 0.9 lb/gal (0.108 kg/l) of absorbing solution. Under such conditions the partially regenerated absorbing solution 24 at the bottom of the first stage contains about 230 ppm $H_2S$ and 17,000 ppm $CO_2$. If a higher steam rate of perhaps 1.0 lb/gal (0.12 kg/l) were used, this bottom solution 24 would then contain about 140 ppm $H_2S$ and 14,300 ppm $CO_2$. In the practice of this invention a practical stripping steam rate is 0.5 to 2.0 lb/gal (0.06 to 0.24 kg/l) of absorbing solution. It should be noted that the degree of stripping in this stage has some flexibility and relates directly to the allowable amount of $CO_2$ in the acid gas stream to the sulfur recovery system and the amount of $H_2S$ ultimately to be vented to the atmosphere from the second desorption stage described hereinafter. Thus the level of $H_2S$ remaining in the partially regenerated solution leaving the first desorption stage must be predetermined and a sufficient rate of stripping steam supplied to achieve this level of $H_2S$ desorption.

The acid gases and the water vapor from the first desorption stage 22 exit the top in stream 26, are cooled in an overhead or reflux condenser 28, and are collected in a phase separator (or accumulator) 30 which is segregated from desorption stage 22 by partition 31. From phase separator 30 the condensate 32 as stream 33 is combined with stream 16 and returned to the first desorption stage 22 and the acid gases in gas stream 34 are sent to a sulfur recovery system such as a Claus plant, not shown. In the case of a steam stripping rate of 0.9 lb/gal (0.108 kg/l) in this first desorption stage, the acid gases in gas stream 34 amount to about 850 ft$^3$/min (24.1 m$^3$/min) comprising about 42% $H_2S$, 4% HCN, and 54% $CO_2$. This is a considerable improvement over a conventional system having a single large desorption stage that would produce about 1200 ft$^3$/min (34 m$^3$/min) of acid gases containing only about 30% $H_2S$, about 5% HCN and about 65% $CO_2$. This conventional system operates at a steam rate of about 0.9 lb/gal (0.108 kg/l), a pressure of about 8 to 12 psig (1.54 to 1.82 atm abs) and a temperature of about 240°-250° F. (115°-121° C.) but has a single, larger desorption column so that the residence time of the solution in the desorption column is long enough to permit the required desorption of $CO_2$. The regenerated solution must be stripped of enough $CO_2$ so that it sufficiently absorbs the $H_2S$ in the absorption stage.

The partially regenerated solution 24 leaving the bottom of the first desorption stage in stream 36 enters the top of the second desorption stage 38 which is segregated from phase separator 30 by partition 39. In the second desorption stage 38 the solution is similarly steam stripped of a good portion of the residual acid gas, which at this point is mostly $CO_2$. The steam flow rate from line 64 for this stage, which may be 0.5 to 1.0 lb/gal (0.06 to 0.12 kg/l) of absorbing solution, is preferably about 0.5 to 0.6 lb/gal (0.06 to 0.072 kg/l) in order to remove the $CO_2$ to levels of less than 0.06 moles $CO_2$/mole MEA so as to minimize corrosion of the vulnerable reboiler tube bundle 48 in reboiler 44.

The bottom solution 40 in the second desorption stage 38 leaves as stream 42 and enters the reboiler 44. Steam is conducted by line 46 through reboiler 44 via tube bundle 48 to indirectly heat and boil the MEA solution. Hot regenerated MEA solution passes from reboiler 44 by line 50 into surge tank 52 which may also receive MEA make-up stream 54. From surge tank 52 the hot regenerated MEA solution passes as stream 56 through heat exchanger 20 in which it loses some of its heat to spent MEA stream 16 and through cooler 58 in an unexpanded state to finally enter absorber 12 as cooled, regenerated, recycled MEA absorbing solution which is now at a temperature of 90°–110° F. (32°–44° C.). The MEA solution now contains about 5000 or less ppm $CO_2$ and about 15% by weight MEA.

In reboiler 44, which is operated at 8–12 psig (1.54–1.82 atm abs) pressure, MEA solution is boiled at about 247° F. (120° C.) to produce a total steam rate of about 1.5 lb/gal (0.18 kg/l) of solution. The steam leaves reboiler 44 in stream 60 which branches into stream 62 and 64 to supply steam for the first and the second desorption stages, respectively. Steam stream 60 should consist of about 1100 lb/min (500 kg/min) steam and about 100 ft$^3$/min (2.83 m$^3$/min) $CO_2$. About 100 lb/min (45.4 kg/min) steam is provided by stream 66 from the reclaimer 68. A slip stream 70 of hot regenerated MEA solution is fed to reclaimer 68 to recover chemically bound MEA and to remove dissolved solids as sludge stream 72 for disposal. Steam is supplied to reclaimer 68 by line 74.

As in the first desorption stage 22 the acid gases and water vapor in stream 76 leave the top of the second desorption stage 38, are cooled in a reflex condenser 78 and are collected in a phase separator 80 which is segregated from the second desorption stage by partition 81. The condensate 82 in stream 83 from phase separator 80 is joined with stream 36 for passage into the top of second desorption stage 38. The liberated acid gases in stream 84 from phase separator 80 are released to the atmosphere since the stream 84 comprises about 480 ft$^3$/min (13.6 m$^3$/min) of $CO_2$. The $H_2S$ content of stream 84 is equivalent to about 10 grains/100 ft$^3$ (0.23 g/m$^3$) of coke oven gas.

This method for regenerating alkanolamine desulfurizer solutions readily provides a desulfurizer system capable of producing a sweetened coke oven gas having 50 grains or less $H_2S$ per 100 ft$^3$ (1.1 g/m$^3$) of sweetened gas. This invention has all the elements of a conventional alkanolamine desulfurizer system operating at similar temperatures, pressures and flow rates. The difference lies in the regeneration of the spent absorbing solution in two desorption stages connected in series, each stage generating its own separate acid gas stream, and in having a single reboiler provide stripping steam to both desorption stages.

While particular embodiments of the present invention have been shown and described, it is apparent that various changes and modifications may be made, and it is therefore intended in the following claims to cover all such modifications and changes as may fall within the true spirit and scope of this invention.

We claim:

1. In a process for treating an $H_2S$ and $CO_2$ containing gas stream with an alkanolamine absorbing solution in an absorption stage, removing from the absorption stage a spent alkanolamine absorbing solution containing absorbed $H_2S$ and $CO_2$, conveying the spent absorbing solution to a desorption stage, steam stripping the absorbed $H_2S$ and $CO_2$ from the spent absorbing solution to yield an $H_2S$ and $CO_2$ acid gas stream for routing to a sulfur recovery plant and a regenerated alkanolamine absorbing solution for recycling to the absorption stage, the improvement comprising (a) passing the spent alkanolamine absorbing solution to a first desorption stage,
   (b) stripping the spent alkanolamine absorbing solution with steam to liberate substantially all the absorbed $H_2S$ yielding an acid gas stream for the sulfur recovery plant and a partially regenerated alkanolamine absorbing solution, (c) passing the partially regenerated alkanolamine absorbing solution to a second desorption stage, (d) stripping the partially regenerated alkanolamine absorbing solution with steam under substantially the same pressure existing during step (b) to liberate primarily $CO_2$ and to afford a regenerated alkanolamine absorbing solution for recycling to the absorption stage, and (e) heating the regenerated alkanolamine absorbing solution to generate stripping steam which is proportioned between the first and the second desorption stages to effect the stripping of the $H_2S$ and the $CO_2$ in steps (b) and (d), respectively.

2. The process of claim 1 in which the first and the second desorption stages are operated in the pressure range of 8-12 psig.

3. The process of claims 1 or 2 in which the alkanolamine is monoethanolamine.

4. The process of claims 1 or 2 in which the stripping steam is generated under an 8-12 psig pressure.

5. The process of claim 4 in which the alkanolamine is monoethanolamine.

6. The process of claim 1 including
(f) cooling the regenerated alkanolamine absorbing solution and passing the cooled solution in an unexpanded state to the absorption stage.

7. The process of claim 6 in which the first and the second desorption stages are operated in the pressure range of 8-12 psig.

8. The process of claims 6 or 7 in which the alkanolamine is monoethanolamine.

* * * * *